US009280534B2

(12) United States Patent
Hauser et al.

(10) Patent No.: US 9,280,534 B2
(45) Date of Patent: Mar. 8, 2016

(54) GENERATING A SOCIAL GLOSSARY

(71) Applicants: Jasper Reid Hauser, San Francisco, CA (US); Luke St. Clair, Redmond, WA (US); David Harry Garcia, Sunnyvale, CA (US); Jenny Yuen, Cambridge, MA (US)

(72) Inventors: Jasper Reid Hauser, San Francisco, CA (US); Luke St. Clair, Redmond, WA (US); David Harry Garcia, Sunnyvale, CA (US); Jenny Yuen, Cambridge, MA (US)

(73) Assignee: Facebook, Inc., Menlo Park, CA (US)

( * ) Notice: Subject to any disclaimer, the term of this patent is extended or adjusted under 35 U.S.C. 154(b) by 467 days.

(21) Appl. No.: 13/681,227

(22) Filed: Nov. 19, 2012

(65) Prior Publication Data
US 2014/0143665 A1 May 22, 2014

(51) Int. Cl.
G06F 17/27 (2006.01)
(52) U.S. Cl.
CPC ............ G06F 17/273 (2013.01); G06F 17/276 (2013.01)
(58) Field of Classification Search
CPC .................................................. G06F 17/2735
USPC ......................................................... 715/259
See application file for complete search history.

(56) References Cited

U.S. PATENT DOCUMENTS

| | | | | |
|---|---|---|---|---|
| 6,047,300 | A * | 4/2000 | Walfish et al. ................. | 715/257 |
| 8,180,804 | B1 * | 5/2012 | Narayanan .......... | G06F 17/3053 707/798 |
| 8,185,558 | B1 * | 5/2012 | Narayanan ........ | G06F 17/30958 707/798 |
| 8,244,848 | B1 * | 8/2012 | Narayanan ............. | G06Q 50/01 709/218 |
| 8,553,065 | B2 * | 10/2013 | Gannu et al. ................ | 348/14.07 |
| 8,572,129 | B1 * | 10/2013 | Lee ................... | G06F 17/30861 707/798 |
| 8,990,083 | B1 * | 3/2015 | Gannu et al. .................. | 704/240 |
| 2007/0269775 | A1 * | 11/2007 | Andreev et al. ............... | 434/156 |
| 2009/0077130 | A1 * | 3/2009 | Abernethy et al. ........ | 707/104.1 |
| 2009/0228296 | A1 * | 9/2009 | Ismalon ............................ | 705/1 |
| 2011/0184718 | A1 * | 7/2011 | Chen ................... | G06F 17/2872 704/2 |
| 2012/0053935 | A1 * | 3/2012 | Malegaonkar et al. ....... | 704/235 |
| 2012/0158719 | A1 * | 6/2012 | Gannu et al. ................. | 707/732 |
| 2012/0197995 | A1 * | 8/2012 | Caruso ......................... | 709/204 |
| 2012/0272160 | A1 * | 10/2012 | Spivack et al. ............... | 715/752 |
| 2012/0331049 | A1 * | 12/2012 | Deeter et al. ................ | 709/204 |

(Continued)

OTHER PUBLICATIONS

Wu, Wei, Bin Zhang, and Mari Ostendorf. "Automatic generation of personalized annotation tags for twitter users." In Human language technologies: The 2010 annual conference of the North American chapter of the association for computational linguistics, pp. 689-692. Association for Computational Linguistics, 2010.*

(Continued)

Primary Examiner — Frank D Mills
(74) Attorney, Agent, or Firm — Baker Botts L.L.P.

(57) ABSTRACT

Particular embodiments determine that a textual term is not associated with a known meaning. The textual term may be related to one or more users of the social-networking system. A determination is made as to whether the textual term should be added to a glossary. If so, then the textual term is added to the glossary. Information related to one or more textual terms in the glossary is provided to enhance auto-correction, provide predictive text input suggestions, or augment social graph data. Particular embodiments discover new textual terms by mining information, wherein the information was received from one or more users of the social-networking system, was generated for one or more users of the social-networking system, is marked as being associated with one or more users of the social-networking system, or includes an identifier for each of one or more users of the social-networking system.

20 Claims, 5 Drawing Sheets

(56) References Cited

U.S. PATENT DOCUMENTS

| | | | |
|---|---|---|---|
| 2012/0331063 A1* | 12/2012 | Rajaram | 709/206 |
| 2012/0331064 A1* | 12/2012 | Deeter et al. | 709/206 |
| 2013/0031106 A1* | 1/2013 | Schechter et al. | 707/749 |
| 2013/0041653 A1* | 2/2013 | Tseng | 704/9 |
| 2013/0144878 A1* | 6/2013 | James et al. | 707/736 |
| 2013/0151522 A1* | 6/2013 | Aggarwal et al. | 707/737 |
| 2013/0158987 A1* | 6/2013 | Xing et al. | 704/10 |
| 2013/0159219 A1* | 6/2013 | Pantel et al. | 706/12 |
| 2013/0263019 A1* | 10/2013 | Castellanos et al. | 715/753 |
| 2013/0297689 A1* | 11/2013 | Bhat | G06F 17/2785 709/204 |
| 2014/0028571 A1* | 1/2014 | St. Clair | 345/173 |
| 2014/0095419 A1* | 4/2014 | Gandhi et al. | 706/46 |
| 2014/0108308 A1* | 4/2014 | Stout | G06N 3/08 706/12 |

OTHER PUBLICATIONS

Nasukawa, Tetsuya, and Tohru Nagano. "Text analysis and knowledge mining system." IBM systems journal 40, No. 4 (2001): 967-984.*

* cited by examiner

US 9,280,534 B2

GENERATING A SOCIAL GLOSSARY

TECHNICAL FIELD

This disclosure generally relates to neologisms, in particular, generating a glossary of neologisms.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users. The social-networking system may transmit over one or more networks content or messages related to its services to a mobile or other computing device of a user. A user may also install software applications on a mobile or other computing device of the user for accessing a user profile of the user and other data within the social-networking system.

SUMMARY OF PARTICULAR EMBODIMENTS

Particular embodiments of a social-networking system mine information to learn neologisms and generate a social glossary. As new textual terms are adopted by social-networking users and become commonplace, they may be incorporated into a glossary for a user based on whether the usage context of the neologisms corresponds to the user's profile, e.g., locale, language, gender, age, group, profession, or other profile characteristics. New textual terms may also be adopted based on user polls (at large or within groups of social contacts). Each new textual term may be required to exceed a certain usage threshold before it qualifies as a neologism and not a mistake. The usage threshold may be determined based on usage by: users of the social-networking system, users having a relationship with the user according to the social graph, users using the same language as the user, users located within the same geographic area as the user, users sharing a demographic category with the user, or users sharing similar profile attributes with the user.

DESCRIPTION OF PARTICULAR EMBODIMENTS

Particular embodiments analyze textual terms gathered by mining social-networking information, e.g., status updates, and other sources of information in order to learn neologisms and generate a social glossary. As a new textual term is adopted, it may be incorporated into a social glossary based on whether the usage context of the textual term corresponds to the user's profile, e.g., locale, language, gender, age, group, profession, or other profile characteristics. New textual terms may also be adopted based on user polls (at large or within groups of social contacts), suggestions, machine-learning based on user over-rides of auto-corrections, and by mining online sources of information. Each new textual term may be required to exceed a certain usage threshold before it qualifies as a neologism that may be added to the social glossary (and not a misspelling or typographical error). The usage threshold may be determined based on usage by the general population, users of the social-networking system, users having a relationship with the user according to the social graph, users using the same language as the user, users located within the same geographic area as the user, users sharing a demographic category with the user, users sharing similar profile attributes with the user, or some other sub-group.

Figure 1:
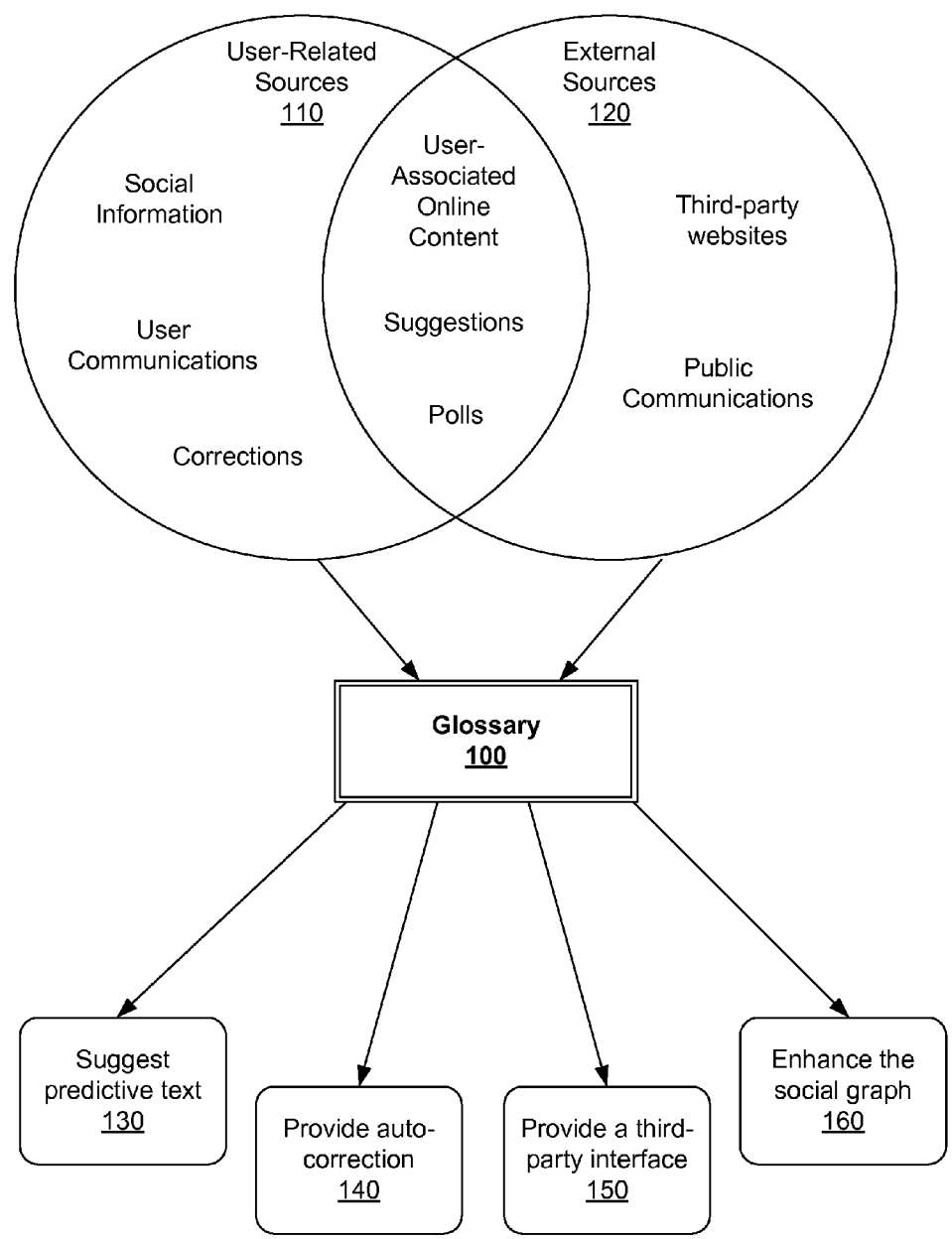
FIG. 1 is a diagram illustrating example sources and uses for a social glossary.

FIG. 1 illustrates example sources and uses for a social glossary. A social glossary 100 may include one or more textual terms that have been determined to be neologisms. For the purpose of this disclosure, a neologism may include any new word or phrase that is in the process of being adopted or becoming known, including slang, terms of art, portmanteaus, syllabic abbreviations, abbreviations, acronyms, names, nicknames, re-purposed words or phrases, or any other type of coined word or phrase. Social glossary 100 may contain but is not primarily intended for words or phrases associated with meanings that are included in widely-available dictionaries, nor is social glossary 100 intended for common typographical errors or misspellings.

Social glossary 100 may be generated based on multiple sources of potential new textual terms, wherein a source of information may provide not only new textual terms but also information related to usage context, user profile information for users who have used or who are likely to use the new textual terms, definitions, synonyms, antonyms, etymology, etc. A source of information may explicitly indicate that a particular textual term should be added to social glossary 100, or it may provide opportunities to detect potential new textual terms. New textual terms may be added to social glossary on the basis of usage statistics, expert opinion, popular opinion, submission, attainment of a threshold for adoption, or any other conventional method of determining that a new textual term should be added to a glossary. The generation of a social glossary based on an information source is described in further detail with respect to FIG. 2.

User-related sources of information 110 may include a number of different sources, such as, by way of example and not limitation, social information related to one or more users, communications involving users, suggestions submitted by users, polls taken by users, or corrections entered by users. The "users" discussed herein may be discussed in the context of a social-networking system; however, particular embodiments may be implemented in the context of any sort of user-based system (e.g., corporate system, organizational system). Social graphs and related social-networking content are described in further detail with respect to FIG. 4 and corresponding text in the specification. Social-networking systems are described in further detail with respect to FIG. 4 and corresponding text in the specification.

User-related sources of information may provide additional information with respect to context, since the user-based system may maintain user profiles for user accounts, as well as maintaining past communications and other information that may enable context analysis and demographic analysis when a new textual term is detected.

Social information may include information such as, by way of example and not limitation, status updates, comments on other users' content, tag information, OR messages accompanying other social actions (e.g., check-in). Communications may include user-to-user communications (e.g., emails, text messages, etc.) or broadcast-style communications originating with a user (e.g., TWEETS, bulletin board posts). Corrections may include user input captured when a user overrides an auto-correction of a term.

User-associated online content includes any type of content that can be associated with a user. Associations with a user may arise when content is generated or edited by a user, when content is posted by a user, when content is associated with a user by a third-party (e.g., a friend tagging a user in a photo or posting), or when the content itself explicitly indicates that it is associated with a user (e.g., news story about a user).

Suggestions may include submissions of new textual terms to add to social glossary 100. In particular embodiments, the suggestion may include usage context information. In particular embodiments, only suggestions from pre-screened individuals (e.g., linguistic professors) may be accepted.

Polls may provide a way to assess popular opinion as to whether or not to add a particular textual term to a social glossary 100. The distribution group for invitations to participate in such a user poll may be determined on the basis of a defined subgroup, e.g., users within a particular group, users having a particular affiliation with an organization, users sharing a particular interest, users within a particular locale, users falling into a particular demographic group, users speaking or writing in a particular language, users connected to one or more social sub-networks, or users sharing any other type of characteristic.

External sources of information 120 may include a number of different sources, such as, by way of example and not limitation, third-party websites, third-party submissions, and public communications. Third-party websites may include any type of website or network-accessible repository of content. Particular embodiments may inspect third-party websites to determine whether new textual terms are being adopted. Particular embodiments may also inspect metadata associated with the third-party websites. Public communications may include any type of public or published content, such as, by way of example announcement, press release, notice, blog, broadcast, etc.

Social glossary 100 may then be used for a number of different purposes. One use case may include suggesting predictive text 130. For example, as user input is typed into an entry field, textual terms in social glossary 100 may be used to perform partial string matching to provide predictive input suggestions. Prediction of user input and display of typeahead results is discussed in further detail in U.S. patent application Ser. No. 12/763,132, filed on 19 Apr. 2010, titled "Dynamically Generating Recommendations Based on Social Graph Information," and issued as U.S. Pat. No. 8,180,804 on 15 May 2012, and also in U.S. patent application Ser. No. 13/631,489, filed on Sep. 28, 2012, titled "Enhanced Predictive Input Utilizing a Typeahead Process," both of which are incorporated herein by reference. Another use case may include providing auto-correction 140. Any conventional technology for providing auto-correction functionality may be used in conjunction with the social glossary. Another use case may include enhancing the social graph 160. In particular embodiments, when a new textual term is added to social glossary 100, a determination may also be made that the new textual term qualifies to be added as a new node, as a new edge type, or as an attribute of an existing node or edge type.

For example, a particular textual term "Necomimi" may have been added to the social glossary as it began to appear on websites, blogs, status updates, and in photo and video tags. If "Necomimi" was classified in the social glossary as a noun related to a commercial product, a "Necomimi" concept node may be added to the social graph, in conjunction with, for example, links to websites associated with the product, links to social-networking users who have posted photos of video of themselves wearing Necomimi ears, and a newsfeed of users' comments and status updates where "Necomimi" is mentioned.

In another example, if a particular textual term "rickrolled" was added to the social glossary as a verb related to an action that one user can perform upon another user, a "rickrolling" edge type may be added to the social graph, so as to capture such actions or activity when occurring between users of the social graph.

In another example, if a particular textual term "blogger" was added to the social glossary as an adjective that can be applied to a user node with a known association to a blog, a "blogger" attribute may be added to user nodes in the social graph who are determined to be associated with a particular blog, along with a link to the user's blog.

Another use case may include providing a third-party interface 150. The third-party interface may provide "pull" functionality for third-party systems to access social glossary 100 in order to retrieve new textual terms or "push" functionality for particular embodiments to send new textual terms out to third-party systems. In particular embodiments, third-party interface may also provide functionality for third-party systems to update or add to social glossary 100.

In particular embodiments, third-party systems may "subscribe" to social glossary 100 in order to receive updates as new textual terms are added. Such subscription-style functionality may be implemented in any conventional manner.

Figure 2:
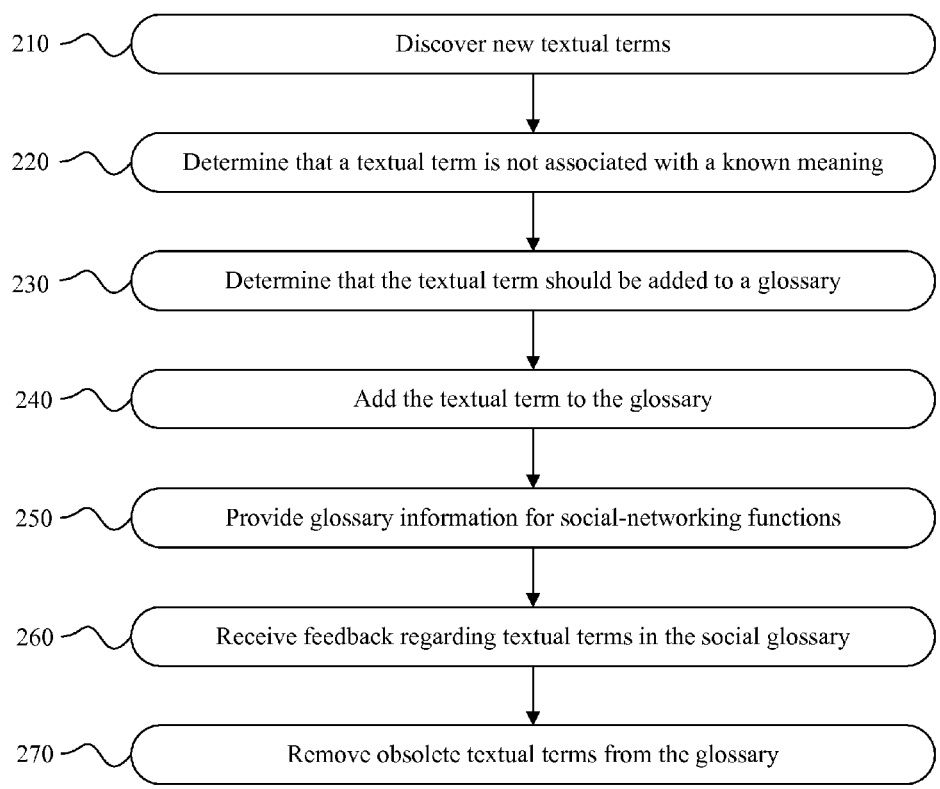
FIG. 2 is a flowchart of an example method according to particular embodiments.

FIG. 2 is a flowchart of an example method for processing combining-character sequences for display on client devices. Client devices are described in greater detail with respect to FIG. 6 and associated paragraphs in the specification.

In step 210, particular embodiments discover one or more new textual terms. In particular embodiments, particular embodiments may receive, host, or seek out sources of information from which new textual terms may be discovered. Examples of such sources of information are discussed in further detail with respect to FIG. 1.

In step 220, particular embodiments determine that a textual term is not associated with a known meaning. This determination may be made by comparing the textual term to existing dictionaries, existing glossaries (e.g., of slang terms, proper names, etc.), or similar references.

This determination may also be made on the basis of an analysis of the textual term to determine the usage context of the textual term. For example, a parsing algorithm may analyze the usage context of the textual term and determine that although the textual term has a known meaning as a proper noun, the textual term is now being used as a verb. As one of skill in the art would be aware, any algorithm for performing natural language parsing may be used in conjunction with embodiments disclosed herein.

In step 230, particular embodiments determine that the textual term should be added to a glossary. This determination may be made on the basis of one or more factors, including, by way of example and not limitation, usage statistics, expert opinion, popular opinion, attainment of a threshold for adoption, or any other conventional method of determining that a new textual term should be added to a glossary.

In particular embodiments, a new textual term may be added once usage statistics for the term indicate that it is more than just a misspelling or typographical error. Such usage statistics may be determined on the basis of a defined subgroup, e.g., users within a particular group, users having a particular affiliation with an organization, users sharing a particular interest, users within a particular locale, users falling into a particular demographic group, users speaking or writing in a particular language, users connected to one or more social sub-networks, or users sharing any other type of characteristic.

In particular embodiments, a new textual term may be identified by examining user overrides of auto-corrections or suggested spelling corrections, or by determining that particular users who rarely make spelling or typographical errors consistently enter the new textual term with the same spelling.

In particular embodiments, a new textual term may be added on the basis of an "expert" opinion or submission. For example, an expert in terminology as related to a particular area may submit a new term for addition to the social glossary (e.g., a submission from the scientists involved in the discovery of the buckminsterfullerene molecule to add "buckyball" to the social glossary as a synonym and nickname for "buckminsterfullerene").

In particular embodiments, a new textual term may be added on the basis of popular opinion. For example, results of a user poll may indicate that the new textual term should be added to the glossary. The distribution group for invitations to participate in such a user poll may be determined on the basis of a defined subgroup, e.g., users within a particular group, users having a particular affiliation with an organization, users sharing a particular interest, users within a particular locale, users falling into a particular demographic group, users speaking or writing in a particular language, users connected to one or more social sub-networks, or users sharing any other type of characteristic. Results of such a poll defined on a subgroup-basis may provide correlating metadata information about profile characteristics of the polled group that can be associated with the new textual term.

In particular embodiments, a new textual term may be added on the basis of attainment of a threshold for adoption. The threshold for adoption may be determined in any manner. In one example, particular embodiments may require that the textual term appear in a sufficient number of usage contexts so as to be able to derive certain information about the usage or meaning of the textual term. In another example, particular embodiments may require that a textual term appear in a sufficiently-diverse set of information sources so as to avoid simple propagation of cut-and-paste-type errors.

In particular embodiments, the determination of whether to add a new textual term to the social glossary may be managed entirely or in part by an administrator who can evaluate one or more of the above-described and any additional factors.

In step 240, particular embodiments may add the textual term to the social glossary. Upon adding the textual term to the social glossary, particular embodiments may update other related tables, data stores, systems, pages, functionality, or third-party systems, such as, by way of example and not limitation: updating an index for a database table that facilitates rapid access to textual terms in the social glossary; updating an index or database table associated with popular new terms for the purpose of presenting suggestions based on predictive text input; updating an index or database table associated with commonly-misspelled terms for the purpose of providing auto-correction functionality; pushing social glossary updates to third-party systems that have subscribed to the social glossary (as described in further detail with respect to FIG. 1); creating nodes or edge types in a social graph (as described in further detail with respect to FIG. 1); or adding attribute information to existing nodes or edges in a social graph (as described in further detail with respect to FIG. 1).

Particular embodiments may store a textual term in association with related information. In particular embodiments, a textual term may be associated with metadata or other information related to the textual term. Examples of metadata or other information include but are not limited to: a classification under a particular lexical category as a noun, pronoun, adjective, verb, adverb, preposition, conjunction, interjection, etc.; a definition, synonym(s), antonym(s), example and/or typical usage context(s), alternate spelling(s); one or more particular oral or written language designations; a particular locale; profile information for known or typical users of the textual term (e.g., age, gender, profession, education, interest(s), demographic element(s), connection to particular social sub-networks, affiliation with one or more groups or organizations); or a temporal, geo-spatial, or social pattern of adoption. Such a pattern of adoption may be determined by tracking usage context for the textual term as adoption becomes more widespread.

In step 250, particular embodiments may provide glossary information for social-networking functions and third-party systems. As described in further detail with respect to FIG. 1, particular embodiments may provide support for general functionality, such as suggestions of predictive text input and provision of auto-corrections, which may be provided either for internal use with respect to a social-networking system or for external use by third-party systems. Particular embodiments may also provide enhancements to the social graph based on the social glossary. Finally, particular embodiments may provide a more generalized third-party interface to add to and update the social glossary, e.g., by using an API.

In step 260, particular embodiments may receive feedback regarding a textual term in the social glossary. Affirmative feedback may be received in the form of additional information received or detected that supports the addition of the textual term to the social glossary or related metadata or other information. Negative feedback may indicate that the textual term is simply a misspelling or typographical error, or that it has become obsolete and is no longer in common use or even disfavored.

In step 270, particular embodiments may remove or flag obsolete textual terms in the social glossary. Determination that a textual term is obsolete may be made in any manner, including techniques related to those described above with respect to step 230.

Figure 3:
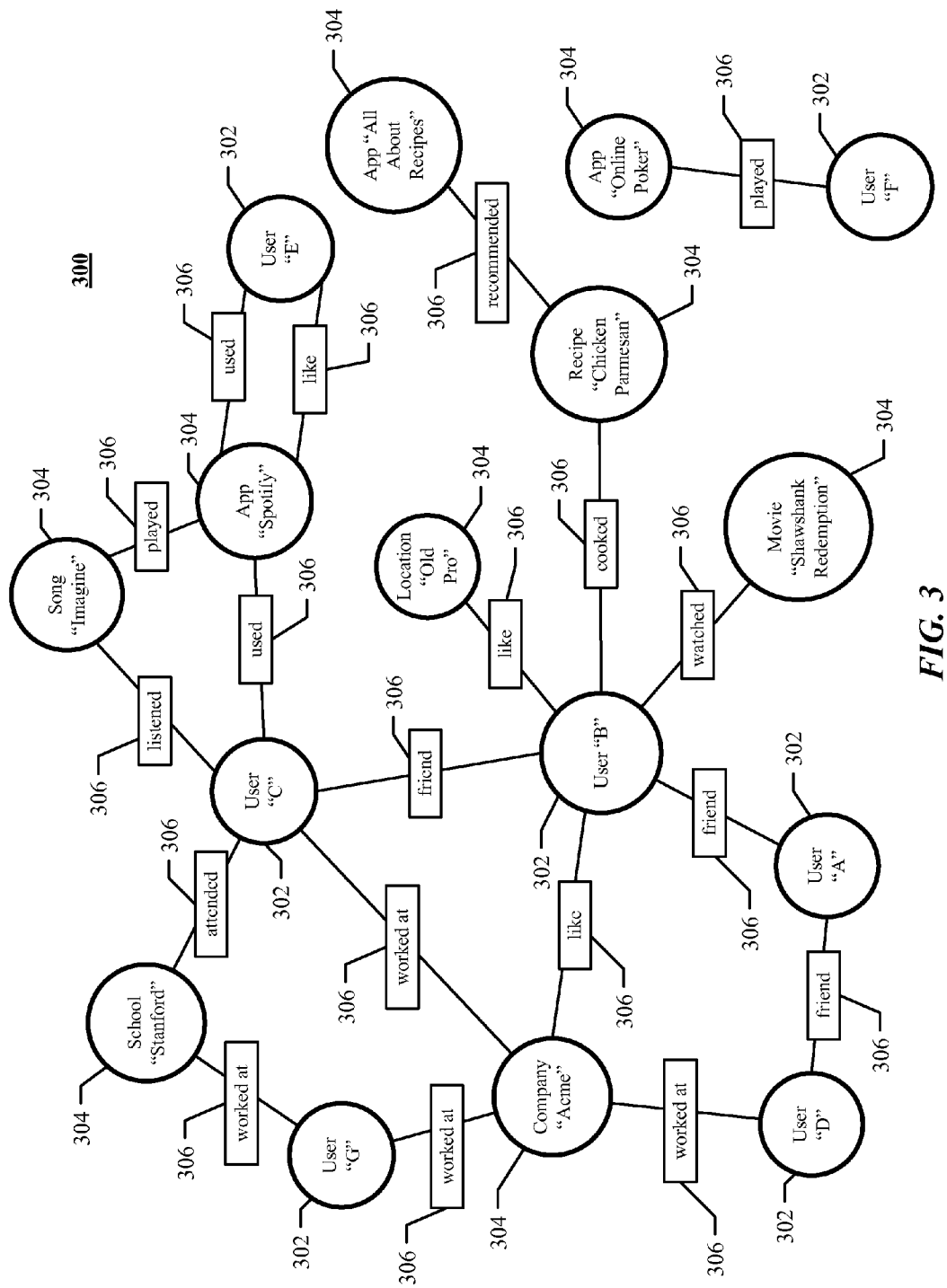
FIG. 3 is a block diagram of an example social graph.

FIG. 3 illustrates example social graph 300. In particular embodiments, social-networking system 460 may store one or more social graphs 300 in one or more data stores. In particular embodiments, social graph 300 may include multiple nodes—which may include multiple user nodes 302 or multiple concept nodes 304—and multiple edges 306 connecting the nodes. Example social graph 300 illustrated in FIG. 3 is shown, for didactic purposes, in a two-dimensional visual map representation. In particular embodiments, a social-networking system 460, client system 430, or third-party system 470 may access social graph 300 and related social-graph information for suitable applications. The nodes and edges of social graph 300 may be stored as data objects, for example, in a data store (such as a social-graph database). Such a data store may include one or more searchable or queryable indexes of nodes or edges of social graph 300.

In particular embodiments, a user node 302 may correspond to a user of social-networking system 460. As an example and not by way of limitation, a user may be an individual (human user), an entity (e.g., an enterprise, business, or third-party application), or a group (e.g., of individuals or entities) that interacts or communicates with or over social-networking system 460. In particular embodiments, when a user registers for an account with social-networking system 460, social-networking system 460 may create a user node 302 corresponding to the user, and store the user node 302 in one or more data stores. Users and user nodes 302 described herein may, where appropriate, refer to registered users and user nodes 302 associated with registered users. In addition or as an alternative, users and user nodes 302 described herein may, where appropriate, refer to users that have not registered with social-networking system 460. In particular embodiments, a user node 302 may be associated with information provided by a user or information gathered by various systems, including social-networking system 460. As an example and not by way of limitation, a user may provide his or her name, profile picture, contact information, birth date, sex, marital status, family status, employment, education background, preferences, interests, or other demographic information. In particular embodiments, a user node 302 may be associated with one or more data objects corresponding to information associated with a user. In particular embodiments, a user node 302 may correspond to one or more webpages or one or more user-profile pages (which may be webpages).

In particular embodiments, a concept node 304 may correspond to a concept. As an example and not by way of limitation, a concept may correspond to a place (such as, for example, a movie theater, restaurant, landmark, or city); a website (such as, for example, a website associated with social-network system 460 or a third-party website associated with a web-application server); an entity (such as, for example, a person, business, group, sports team, or celebrity); a resource (such as, for example, an audio file, video file, digital photo, text file, structured document, or application) which may be located within social-networking system 460 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 304 may be associated with information of a concept provided by a user or information gathered by various systems, including social-networking system 460. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 304 may be associated with one or more data objects corresponding to information associated with concept node 304. In particular embodiments, a concept node 304 may correspond to a webpage.

In particular embodiments, a node in social graph 300 may represent or be represented by a webpage (which may be referred to as a "profile page"). Profile pages may be hosted by or accessible to social-networking system 460. Profile pages may also be hosted on third-party websites associated with a third-party server 470. As an example and not by way of limitation, a profile page corresponding to a particular external webpage may be the particular external webpage and the profile page may correspond to a particular concept node 304. Profile pages may be viewable by all or a selected subset of other users. As an example and not by way of limitation, a user node 302 may have a corresponding user-profile page in which the corresponding user may add content, make declarations, or otherwise express himself or herself. As another example and not by way of limitation, a concept node 304 may have a corresponding concept-profile page in which one or more users may add content, make declarations, or express themselves, particularly in relation to the concept corresponding to concept node 304.

In particular embodiments, a concept node 304 may represent a third-party webpage or resource hosted by a third-party system 470. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system 430 to transmit to social-networking system 460 a message indicating the user's action. In response to the message, social-networking system 460 may create an edge (e.g., an "eat" edge) between a user node 302 corresponding to the user and a concept node 304 corresponding to the third-party webpage or resource and store edge 306 in one or more data stores.

In particular embodiments, a pair of nodes in social graph 300 may be connected to each other by one or more edges 306. An edge 306 connecting a pair of nodes may represent a relationship between the pair of nodes. In particular embodiments, an edge 306 may include or represent one or more data objects or attributes corresponding to the relationship between a pair of nodes. As an example and not by way of limitation, a first user may indicate that a second user is a "friend" of the first user. In response to this indication, social-networking system 460 may transmit a "friend request" to the second user. If the second user confirms the "friend request," social-networking system 460 may create an edge 306 connecting the first user's user node 302 to the second user's user node 302 in social graph 300 and store edge 306 as social-graph information in one or more of data stores 24. In the example of FIG. 3, social graph 300 includes an edge 306 indicating a friend relation between user nodes 302 of user "A" and user "B" and an edge indicating a friend relation between user nodes 302 of user "C" and user "B." Although this disclosure describes or illustrates particular edges 306 with particular attributes connecting particular user nodes 302, this disclosure contemplates any suitable edges 306 with any suitable attributes connecting user nodes 302. As an example and not by way of limitation, an edge 306 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 300 by one or more edges 306.

In particular embodiments, an edge 306 between a user node 302 and a concept node 304 may represent a particular action or activity performed by a user associated with user node 302 toward a concept associated with a concept node 304. As an example and not by way of limitation, as illustrated in FIG. 3, a user may "like," "attended," "played," "listened," "cooked," "worked at," or "watched" a concept, each of which may correspond to a edge type or subtype. A concept-profile page corresponding to a concept node 304 may include, for example, a selectable "check in" icon (such as, for example, a clickable "check in" icon) or a selectable "add to favorites" icon. Similarly, after a user clicks these icons, social-networking system 460 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 460 may create a "listened" edge 306 and a "used" edge (as illustrated in FIG. 3) between user nodes 302 corresponding to the user and concept nodes 304 corresponding to the song and application to indicate that the user listened to the song and used the application. Moreover, social-networking system 460 may create a "played" edge 306 (as illustrated in FIG. 3) between concept nodes 304 corresponding to the song and the application to indicate that the particular song was played by the particular application. In this case, "played" edge 306 corresponds to an action performed by an external application (SPOTIFY) on an external audio file (the song "Imagine"). Although this disclosure describes particular edges 306 with particular attributes connecting user nodes 302 and concept nodes 304, this disclosure contemplates any suitable edges 306 with any suitable attributes connecting user nodes 302 and concept nodes 304. Moreover, although this disclosure describes edges between a user node 302 and a concept node 304 representing a single relationship, this disclosure contemplates edges between a user node 302 and a concept node 304 representing one or more relationships. As an example and not by way of limitation, an edge 306 may represent both that a user likes and has used at a particular concept. Alternatively, another edge 306 may represent each type of relationship (or multiples of a single relationship) between a user node 302 and a concept node 304 (as illustrated in FIG. 3 between user node 302 for user "E" and concept node 304 for "SPOTIFY").

In particular embodiments, social-networking system 460 may create an edge 306 between a user node 302 and a concept node 304 in social graph 300. As an example and not by way of limitation, a user viewing a concept-profile page (such as, for example, by using a web browser or a special-purpose application hosted by the user's client system 430) may indicate that he or she likes the concept represented by the concept node 304 by clicking or selecting a "Like" icon, which may cause the user's client system 430 to transmit to social-networking system 460 a message indicating the user's liking of the concept associated with the concept-profile page. In response to the message, social-networking system 460 may create an edge 306 between user node 302 associated with the user and concept node 304, as illustrated by "like" edge 306 between the user and concept node 304. In particular embodiments, social-networking system 460 may store an edge 306 in one or more data stores. In particular embodiments, an edge 306 may be automatically formed by social-networking system 460 in response to a particular user action. As an example and not by way of limitation, if a first user uploads a picture, watches a movie, or listens to a song, an edge 306 may be formed between user node 302 corresponding to the first user and concept nodes 304 corresponding to those concepts. Although this disclosure describes forming particular edges 306 in particular manners, this disclosure contemplates forming any suitable edges 306 in any suitable manner.

Figure 4:
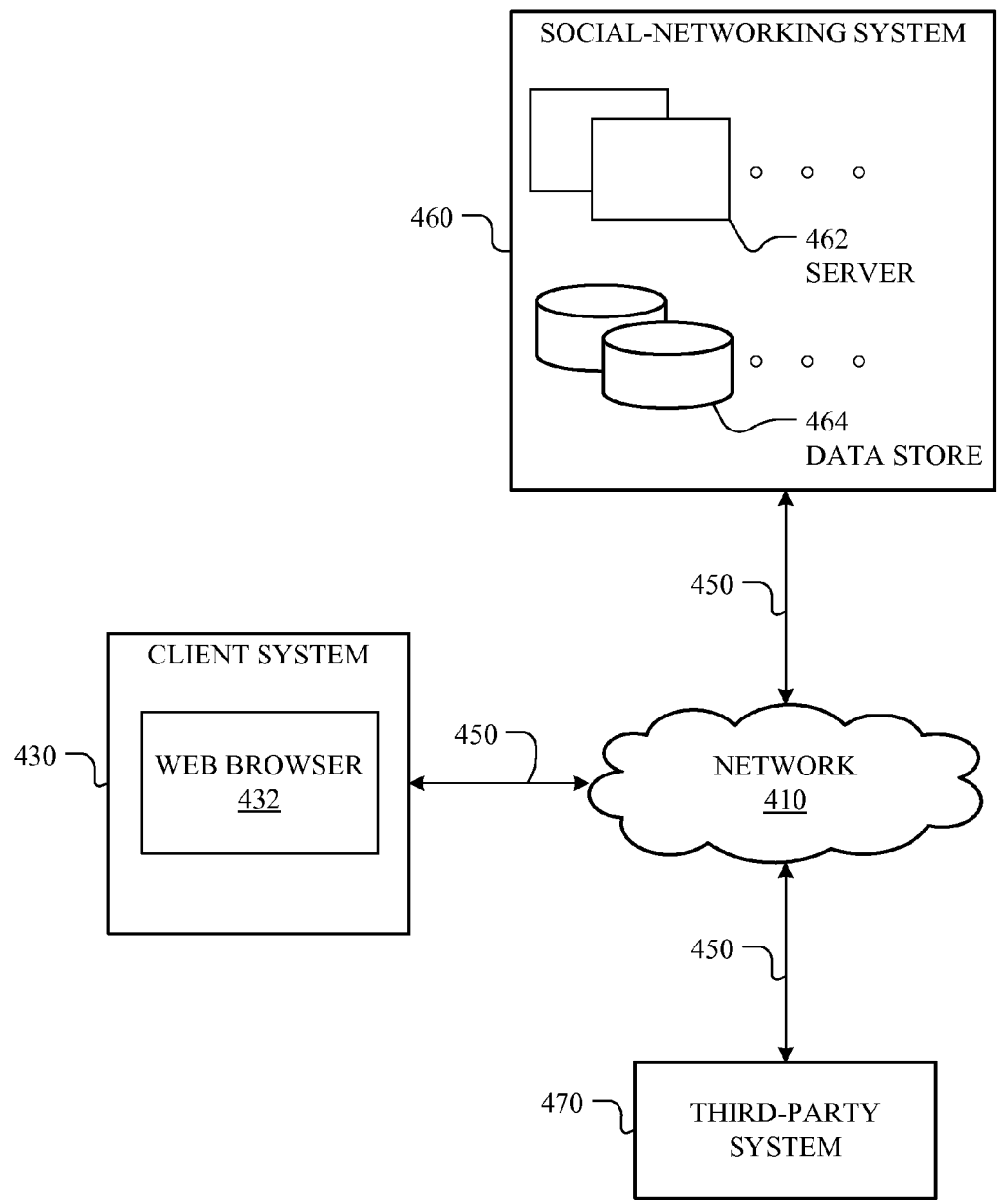
FIG. 4 is a block diagram of an example network environment associated with a social-networking system.

FIG. 4 illustrates an example network environment 400 associated with a social-networking system. Network environment 400 includes a client system 430, a social-networking system 460, and a third-party system 470 connected to each other by a network 410. Although FIG. 4 illustrates a particular arrangement of client system 430, social-networking system 460, third-party system 470, and network 410, this disclosure contemplates any suitable arrangement of client system 430, social-networking system 460, third-party system 470, and network 410. As an example and not by way of limitation, two or more of client system 430, social-networking system 460, and third-party system 470 may be connected to each other directly, bypassing network 410. As another example, two or more of client system 430, social-networking system 460, and third-party system 470 may be physically or logically co-located with each other in whole or in part. Moreover, although FIG. 4 illustrates a particular number of client systems 430, social-networking systems 460, third-party systems 470, and networks 410, this disclosure contemplates any suitable number of client systems 430, social-networking systems 460, third-party systems 470, and networks 410. As an example and not by way of limitation, network environment 400 may include multiple client system 430, social-networking systems 460, third-party systems 470, and networks 410.

This disclosure contemplates any suitable network 410. As an example and not by way of limitation, one or more portions of network 410 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 410 may include one or more networks 410.

Links 450 may connect client system 430, social-networking system 460, and third-party system 470 to communication network 410 or to each other. This disclosure contemplates any suitable links 450. In particular embodiments, one or more links 450 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 450 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 450, or a combination of two or more such links 450. Links 450 need not necessarily be the same throughout network environment 400. One or more first links 450 may differ in one or more respects from one or more second links 450.

In particular embodiments, client system 430 may be an electronic device including hardware, software, or embedded logic components or a combination of two or more such components and capable of carrying out the appropriate functionalities implemented or supported by client system 430. As an example and not by way of limitation, a client system 430 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 430. A client system 430 may enable a network user at client system 430 to access network 410. A client system 430 may enable its user to communicate with other users at other client systems 430.

In particular embodiments, client system 430 may include a web browser 432, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 430 may enter a Uniform Resource Locator (URL) or other address directing the web browser 432 to a particular server (such as server 462, or a server associated with a third-party system 470), and the web browser 432 may generate a Hyper Text Transfer Protocol (HTTP) request and communicate the HTTP request to server. The server may accept the HTTP request and communicate to client system 430 one or more Hyper Text Markup Language (HTML) files responsive to the HTTP request. Client system 430 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 460 may be a network-addressable computing system that can host an online social network. Social-networking system 460 may generate, store, receive, and transmit social-networking data, such as, for example, user-profile data, concept-profile data, social-graph information, or other suitable data related to the online social network. Social-networking system 460 may be accessed by the other components of network environment 400 either directly or via network 410. In particular embodiments, social-networking system 460 may include one or more servers 462. Each server 462 may be a unitary server or a distributed server spanning multiple computers or multiple datacenters. Servers 462 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 462 may include hardware, software, or embedded logic components or a combination of two or more such components for carrying out the appropriate functionalities implemented or supported by server 462. In particular embodiments, social-networking system 464 may include one or more data stores 464. Data stores 464 may be used to store various types of information. In particular embodiments, the information stored in data stores 464 may be organized according to specific data structures. In particular embodiments, each data store 464 may be a relational, columnar, correlation, or other suitable database. Although this disclosure describes or illustrates particular types of databases, this disclosure contemplate any suitable types of databases. Particular embodiments may provide interfaces that enable a client system 430, a social-networking system 460, or a third-party system 470 to manage, retrieve, modify, add, or delete, the information stored in data store 464.

In particular embodiments, social-networking system 460 may store one or more social graphs in one or more data stores 464. In particular embodiments, a social graph may include multiple nodes—which may include multiple user nodes (each corresponding to a particular user) or multiple concept nodes (each corresponding to a particular concept)—and multiple edges connecting the nodes. Social-networking system 460 may provide users of the online social network the ability to communicate and interact with other users. In particular embodiments, users may join the online social network via social-networking system 460 and then add connections (i.e., relationships) to a number of other users of social-networking system 460 whom they want to be connected to. Herein, the term "friend" may refer to any other user of social-networking system 460 with whom a user has formed a connection, association, or relationship via social-networking system 460.

In particular embodiments, social-networking system 460 may provide users with the ability to take actions on various types of items or objects, supported by social-networking system 460. As an example and not by way of limitation, the items and objects may include groups or social networks to which users of social-networking system 460 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 460 or by an external system of third-party system 470, which is separate from social-networking system 460 and coupled to social-networking system 460 via a network 410.

In particular embodiments, social-networking system 460 may be capable of linking a variety of entities. As an example and not by way of limitation, social-networking system 460 may enable users to interact with each other as well as receive content from third-party systems 470 or other entities, or to allow users to interact with these entities through an application programming interfaces (API) or other communication channels.

In particular embodiments, a third-party system 470 may include one or more types of servers, one or more data stores, one or more interfaces, including but not limited to APIs, one or more web services, one or more content sources, one or more networks, or any other suitable components, e.g., that servers may communicate with. A third-party system 470 may be operated by a different entity from an entity operating social-networking system 460. In particular embodiments, however, social-networking system 460 and third-party systems 470 may operate in conjunction with each other to provide social-networking services to users of social-networking system 460 or third-party systems 470. In this sense, social-networking system 460 may provide a platform, or backbone, which other systems, such as third-party systems 470, may use to provide social-networking services and functionality to users across the Internet.

In particular embodiments, a third-party system 470 may include a third-party content object provider. A third-party content object provider may include one or more sources of content objects, which may be communicated to a client system 430. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 460 also includes user-generated content objects, which may enhance a user's interactions with social-networking system 460. User-generated content may include anything a user can add, upload, send, or "post" to social-networking system 460. As an example and not by way of limitation, a user communicates posts to social-networking system 460 from a client system 430. Posts may include data such as status updates or other textual data, location information, photos, videos, links, music or other similar data or media. Content may also be added to social-networking system 460 by a third-party through a "communication channel," such as a newsfeed or stream.

In particular embodiments, social-networking system 460 may include a variety of servers, sub-systems, programs, modules, logs, and data stores. In particular embodiments, social-networking system 460 may include one or more of the following: a web server, action logger, API-request server, relevance-and-ranking engine, content-object classifier, notification controller, action log, third-party-content-object-exposure log, inference module, authorization/privacy server, search module, ad-targeting module, user-interface module, user-profile store, connection store, third-party content store, or location store. Social-networking system 460 may also include suitable components such as network interfaces, security mechanisms, load balancers, failover servers, management-and-network-operations consoles, other suitable components, or any suitable combination thereof. In particular embodiments, social-networking system 460 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 460 to one or more client systems 430 or one or more third-party system 470 via network 410. The web server may include a mail server or other messaging functionality for receiving and routing messages between social-networking system 460 and one or more client systems 430. An API-request server may allow a third-party system 470 to access information from social-networking system 460 by calling one or more APIs. An action logger may be used to receive communications from a web server about a user's actions on or off social-networking system 460. In conjunction with the action log, a third-party-content-object log may be maintained of user exposures to third-party-content objects. A notification controller may provide information regarding content objects to a client system 430. Information may be pushed to a client system 430 as notifications, or information may be pulled from client system 430 responsive to a request received from client system 430. Authorization servers may be used to enforce one or more privacy settings of the users of social-networking system 460. A privacy setting of a user determines how particular information associated with a user can be shared. The authorization server may allow users to opt in or opt out of having their actions logged by social-networking system 460 or shared with other systems (e.g., third-party system 470), such as, for example, by setting appropriate privacy settings. Third-party-content-object stores may be used to store content objects received from third parties, such as a third-party system 470. Location stores may be used for storing location information received from client systems 430 associated with users. Ad-pricing modules may combine social information, the current time, location information, or other suitable information to provide relevant advertisements, in the form of notifications, to a user.

Figure 5:
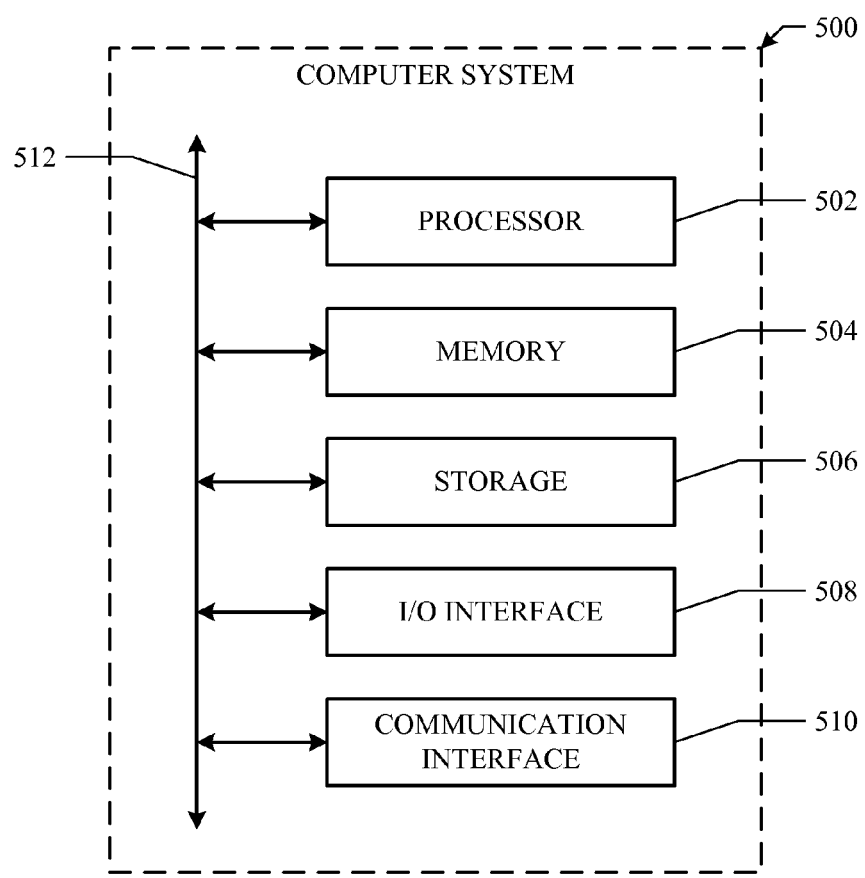
FIG. 5 is a block diagram of an example computer system.

FIG. 5 illustrates an example computer system 500. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500. Herein, reference to a computer system may encompass a computing device, where appropriate. Moreover, reference to a computer system may encompass one or more computer systems, where appropriate.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, another mobile computing device, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, I/O interface 508 may include additional hardware, software, or both to support one or more sensors to provide additional information, such as, for example and without limitation: a touch sensor (disposed, for example, on a display of the device, the back of the device and/or one or more lateral edges of the device) for detecting a user touching the surface of the mobile electronic device (e.g., using one or more fingers); an accelerometer for detecting whether the personal computing device 200 is moving and the speed of the movement; a thermometer for measuring the temperature change near the personal computing device 200; a proximity sensor for detecting the proximity of the personal computing device 200 to another object (e.g., a hand, desk, or other object); a light sensor for measuring the ambient light around the personal computing device 200; an imaging sensor (e.g., camera) for capturing digital still images and/or video of objects near the personal computing device 200 (e.g., scenes, people, bar codes, QR codes, etc.); a location sensor (e.g., a Global Positioning System (GPS)) for determining the location (e.g., in terms of latitude and longitude) of the mobile electronic device; a sensor for detecting communication networks within close proximity (e.g., near field communication (NFC), Bluetooth, RFID, infrared); a chemical sensor; a biometric sensor for biometrics-based (e.g., fingerprint, palm vein pattern, hand geometry, iris/retina, DNA, face, voice, olfactory, sweat) authentication of a user; etc.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network, or an antenna. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such as, for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:

by one or more computer servers associated with a social-networking system, determining that a textual term is not associated with a known meaning, wherein the textual term is related to one or more users of the social-networking system, the user being associated with a user node in a social graph of the social-networking system, the social graph comprising:

a plurality of nodes, the plurality of nodes comprising user nodes and concept nodes, wherein each user node corresponds to a user of the social-networking system; and a plurality of edges, wherein one or more edges connect two nodes, the one or more edges representing a relationship between the two nodes;

by the one or more computer servers, determining that the textual term should be added to a social glossary;

by the one or more computer servers, adding the textual term to the social glossary;

by the one or more computer servers, adding to the social graph a new element representing the textual term, wherein the new element comprises:

a new concept node, wherein the textual term is a noun, a new edge, wherein the textual term is a verb, or a new attribute for the user node, wherein the textual term is an adjective; and by the one or more computer servers, providing information related to one or more textual terms in the social glossary.

2. The method of claim 1, further comprising:
discovering new textual terms by mining information, wherein the information was received from one or more users of the social-networking system, was generated for one or more users of the social-networking system, is marked as being associated with one or more users of the social-networking system, or includes an identifier for each of one or more users of the social-networking system.

3. The method of claim 1, wherein the determination that the textual term is not associated with a known meaning is based on one or more dictionaries, glossaries, logs, or indices.

4. The method of claim 1, wherein the determining that the textual term is not associated with a known meaning is performed in relation to one or more languages associated with the user, one or more languages associated with social graph contacts of the user, one or more languages associated with content generated or consumed by the user, or any language.

5. The method of claim 1, wherein the determining that the textual term should be added to the social glossary comprises determining that the textual term does not represent an error, the determination based on a user override of an auto-correction of the textual term, an addition of the textual term to a personal social glossary of the user, or a set of common spelling errors.

6. The method of claim 1, wherein the determining that the textual term should be added to the social glossary is based on usage statistics for the textual term based on usage by:
users of the social-networking system, users having a relationship with the user according to the social graph, users using the same language as the user, users located within the same geographic area as the user, users sharing a demographic category with the user, or users sharing similar profile attributes with the user.

7. The method of claim 1, wherein the determining that the textual term should be added to the social glossary is based on a usage context of the textual term.

8. The method of claim 1, wherein the determining that the textual term should be added to the social glossary is based on a poll of users.

9. The method of claim 8, wherein the poll is limited to:
users of the social-networking system, users having a relationship with the user according to the social graph, users using the same language as the user, users sharing a demographic category with the user, or users sharing similar profile attributes with the user.

10. The method of claim 1, further comprising: storing the textual term in association with one or more users, groups, locales, user attributes, or usage contexts.

11. The method of claim 1, wherein the providing information related to one or more textual terms in the social glossary comprises:
providing auto-correction of entered text based on the textual terms, providing predictive text input suggestions based on the textual terms, providing an interface for third-party systems to access the social glossary, or providing information to enhance the social graph.

12. The method of claim 11, wherein the adding to the social graph the new element representing the textual term comprises:
determining that the textual term comprises a reference to a person, an entity, content, an action, or anything else represented in the social graph by a node or edge.

13. The method of claim 1, further comprising:
removing information associated with obsolete textual terms from the social glossary.

14. The method of claim 1, further comprising:
providing an interface to manage the social glossary, the interface including functionality to add, remove, edit, and adjust properties of textual terms in the social glossary.

15. One or more computer-readable non-transitory storage media embodying software that is operable when executed to:
determine that a textual term is not associated with a known meaning, wherein the textual term is related to one or more users of a social-networking system, the user being associated with a user node in a social graph of the social-networking system, the social graph comprising:
a plurality of nodes, the plurality of nodes comprising user nodes and concept nodes, wherein each user node corresponds to a user of the social-networking system; and
a plurality of edges, wherein one or more edges connect two nodes, the one or more edges representing a relationship between the two nodes;
determine that the textual term should be added to a social glossary;
add the textual term to the social glossary;
add to the social graph a new element representing the textual term, wherein the new element comprises:
a new concept node, wherein the textual term is a noun,
a new edge, wherein the textual term is a verb, or
a new attribute for the user node, wherein the textual term is an adjective; and
provide information related to one or more textual terms in the social glossary.

16. The media of claim 15, wherein the software is further operable to:
discover new textual terms by mining information, wherein the information was received from one or more users of the social-networking system, was generated for one or more users of the social-networking system, is marked as being associated with one or more users of the social-networking system, or includes an identifier for each of one or more users of the social-networking system.

17. The media of claim 15, wherein the determination that the textual term should be added to the social glossary is based on usage statistics for the textual term based on usage by:
users of the social-networking system, users having a relationship with the user according to the social graph, users using the same language as the user, users located within the same geographic area as the user, users sharing a demographic category with the user, or users sharing similar profile attributes with the user.

18. A system, comprising:
one or more processors; and
a memory coupled to the processors comprising instructions executable by the processors, the processors operable when executing the instructions to:
determine that a textual term is not associated with a known meaning, wherein the textual term is related to one or more users of a social-networking system, the user being associated with a user node in a social graph of the social-networking system, the social graph comprising:
a plurality of nodes, the plurality of nodes comprising user nodes and concept nodes, wherein each user node corresponds to a user of the social-networking system; and a plurality of edges, wherein one or more edges connect two nodes, the one or more edges representing a relationship between the two nodes;
determine that the textual term should be added to a social glossary;
add the textual term to the social glossary;
add to the social graph a new element representing the textual term, wherein the new element comprises:
a new concept node, wherein the textual term is a noun,
a new edge, wherein the textual term is a verb, or
a new attribute for the user node, wherein the textual term is an adjective; and
provide information related to one or more textual terms in the social glossary.

19. The system of claim 18, wherein the processors are further operable to:
discover new textual terms by mining information, wherein the information was received from one or more users of the social-networking system, was generated for one or more users of the social-networking system, is marked as being associated with one or more users of the social-networking system, or includes an identifier for each of one or more users of the social-networking system.

20. The system of claim 18, wherein the determination that the textual term should be added to the social glossary is based on usage statistics for the textual term based on usage by:
users of the social-networking system, users having a relationship with the user according to the social graph, users using the same language as the user, users located within the same geographic area as the user, users sharing a demographic category with the user, or users sharing similar profile attributes with the user.

* * * * *